United States Patent
Wagner

[11] Patent Number: 5,601,217
[45] Date of Patent: Feb. 11, 1997

[54] TRIGGER ACTIVATED LEAK-PROOF POURER

[76] Inventor: William Wagner, P.O. Box 1095, Monroe, N.Y. 10950

[21] Appl. No.: 517,503
[22] Filed: Aug. 21, 1995
[51] Int. Cl.$^6$ ............................................. B67D 3/00
[52] U.S. Cl. ........................ 222/481.5; 222/482; 222/517
[58] Field of Search ............................ 222/1, 479, 481, 222/481.5, 482, 517, 569

[56] References Cited

U.S. PATENT DOCUMENTS

| | | | |
|---|---|---|---|
| Re. 14,268 | 3/1917 | Day | 222/482 X |
| 43,703 | 8/1864 | Pein | 222/454 |
| 1,054,146 | 2/1913 | Smirle | 222/481.5 |
| 1,486,199 | 3/1924 | Skiles | 222/482 |
| 2,298,957 | 10/1942 | Mazzarelli | 222/482 |
| 2,647,660 | 8/1953 | Arena | 222/38 |
| 2,652,177 | 9/1953 | Lagemann | 222/509 |
| 2,915,224 | 12/1959 | Beall, Jr. | 222/479 X |
| 4,212,408 | 7/1980 | Valenzona | 220/254 |
| 4,276,992 | 7/1981 | Susich | 222/254 |
| 4,925,068 | 5/1990 | Schneider | 222/481 X |
| 5,392,966 | 2/1995 | Bunin | 222/454 |

FOREIGN PATENT DOCUMENTS

| | | | |
|---|---|---|---|
| 187444 | 12/1955 | Austria | 222/482 |
| 715525 | 12/1931 | France | 222/482 |
| 3503643 | 8/1986 | Germany | 222/481 |

*Primary Examiner*—Andres Kashnikow
*Assistant Examiner*—Kenneth Bomberg
*Attorney, Agent, or Firm*—Sandra M. Kotin

[57] ABSTRACT

A removable leakproof stopper for use with liquid containing bottles which enables the user to quickly and easily dispense desired quantities of liquid and the method of use of the stopper. The stopper is a hollow chamber with a pour spout located at the top. A horizontal partition containing an exit port divides the chamber into two sections. The exit port is closed with a plug activated by a trigger which is located outside the chamber. Beneath the partition is a delivery tube attached about the interior circumference of the chamber. The delivery tube tapers downward to a constant bore portion which extends into the neck of the bottle. A compressible collar surrounding the constant bore portion provides a tight seal within necks of bottles of varying interior diameters. An opening in the wall of the chamber communicates with a pressure equalizing tube. A second trigger is used to close this opening. The triggers are oriented to permit both to be depressed simultaneously for good control and smooth delivery of liquid. There can be no leakage through the stopper if the bottle is tipped over or inverted and liquid can only be dispensed when both triggers are depressed simultaneously.

7 Claims, 2 Drawing Sheets

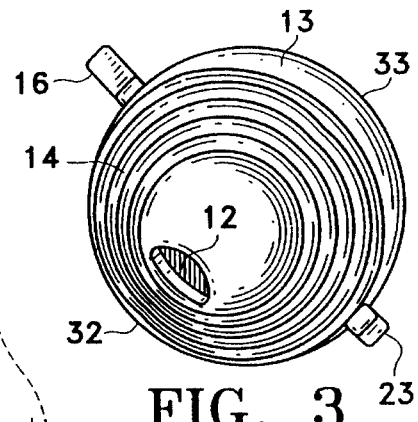
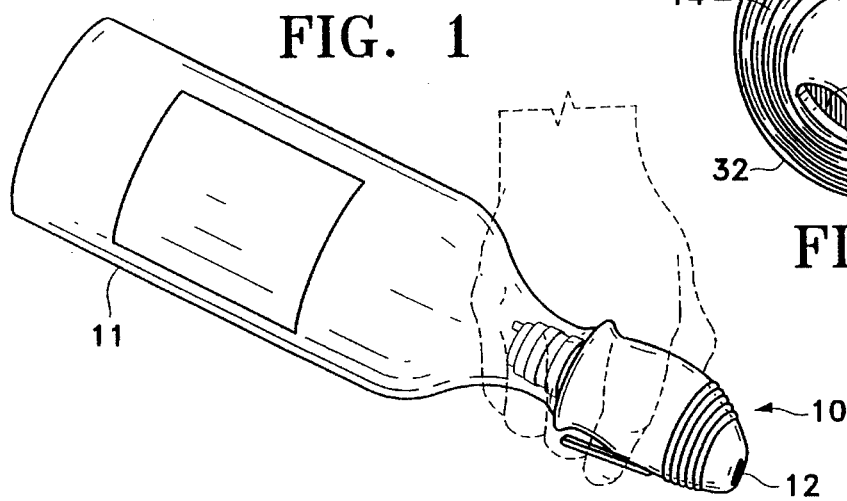
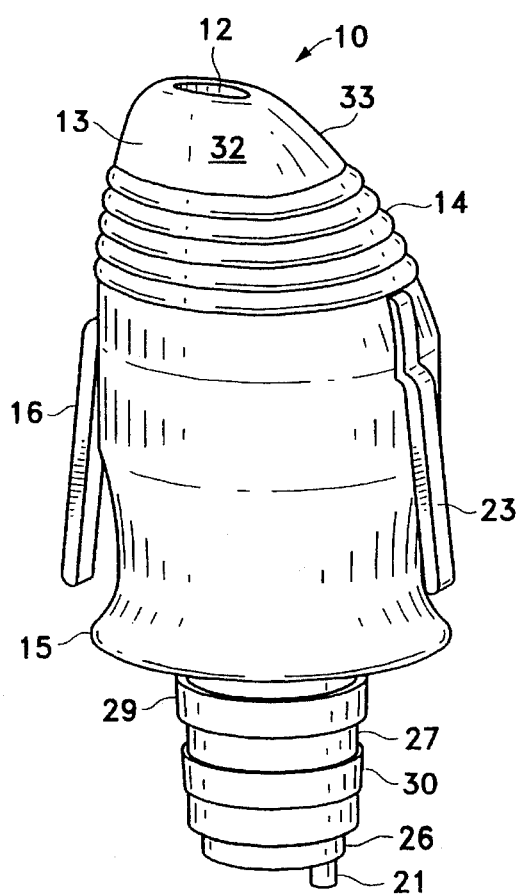
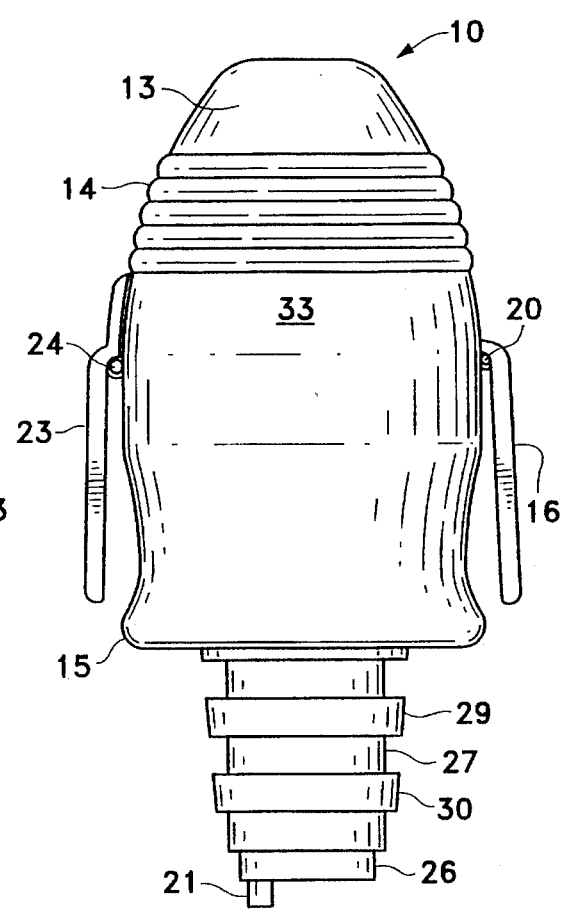

TRIGGER ACTIVATED LEAK-PROOF POURER

FIELD OF THE INVENTION

The instant invention relates to a removable trigger activated pour spout for use with liquid containing bottles such as liquor bottles, enabling the liquid to be dispensed at the will of the user, but preventing spillage or leakage if the bottle is inverted, knocked over or dropped.

BACKGROUND OF THE INVENTION

There have been a variety of dispensing stoppers marketed to aid the bar tender and make his or her tasks easier and faster. However, in order to accomplish this, the stoppers have loose-fitting closure means or no closure means and if a bottle is inadvertently knocked over or dropped, the liquor leaks out and profits are lost. Additionally, in the event that a bartender wishes to create a show of his or her mixology or showmanship talents, bottles cannot be spun, twisted or juggled in any way because the usual bar stoppers are not equipped with means to prevent the liquid from splashing or spilling out of the bottles. Other available bar stoppers have internal measuring means to regulate the quantity of liquor dispensed. Many experienced bartenders feel that these detract from their expertise in dispensing the correct portion.

There have been patents issued for a variety of dispensing stoppers for liquid containers, but though these have had closing means to prevent spillage, the stoppers have been geared to dispensing measured quantities of liquid, usually medicine doses, and so are of a more complex nature than needed for tavern and bar dispensing.

Pein (U.S. Pat. No. 43,703) taught a measuring nozzle for liquid containers that was filled by inverting the container so the liquid filled the angled nozzle. By turning the container to a hoizontal orientation all but the measured dose was returned to the container and that dose was dispensed when the user depressed a lever and released a stopper covering the nozzle opening.

Arena (U.S. Pat. No. 2,647,660) taught a metering liquid dispensing head or stopper that additionally recorded the number of doses dispensed through the stopper. A trigger articulated with a spring activated rod that controled a sliding member which in turn opened a port permitting liquid to enter the metered stopper when the container was tipped over and the trigger depressed. The same sliding member closed that port and opened the exit spout when the trigger was released. Depressing the trigger also activated a counter so the number changed each time the trigger was utilized.

Another dispensing cap for liquid containers had a cylindrical shaft resting within a helical walled chamber such that the volume of a dose could be varied by turning an indicator knob at the top of the cap. This cap was also filled by tipping the bottle over. When righted, all liquid above the level of the helical wall returned to the bottle. A trigger was used to control a spring activated rod. The measured dose of liquid was caused to exit through a pour spout when the spring valve was activated. (Bunin, U.S. Pat. No. 5,392,966)

There have been several types of dispensing lids for drinking containers or cups that utilize different types of valves to be opened when the user wishes to drink from the cup. (U.S. Pat. No. 4,212,408 to Valenzona; U.S. Pat. No. 4,276,992 to Susich; U.S. Pat. No. 4,361,249 to Tuneski et al.; U.S. Pat. No. 4,441,624 to Sokolowski; and U.S. Pat. No. 55 5,199,597 to Gladish)

There is a need for a removable dispensing stopper that can be used in a variety of bottles that is easy to use and can dispense the quantity of liquid desired by the user and at the same time will prevent leakage and spills if the bottle is inverted or accidently tipped over or dropped. There is a need for such a stopper that fits tightly into the open neck of the bottle, but can easily be removed, cleaned and fitted into another like or similar bottle. There is a need for a stopper with a tightly closed port such that twirling or tossing the bottle will not dislodge the stopper or cause the port to open, but which is readily and easily opened when the user wishes to dispense the liquid.

BRIEF SUMMARY OF THE INVENTION

The present invention provides a removable and reusable pour stopper for use with liquor bottles or other similar liquid containing bottles. The stopper is designed so that the liquid is easily dispensed in an amount determined by the user with no loss of liquid by after-drips. The quantity of liquid dispensed is controlled by depressing a trigger which opens an exit port within the stopper. The liquid flows through the open exit port and out of the stopper through a pour spout. To assist in the free flow of liquid there is a pressure equalizing tube that communicates with the interior of the bottle. The opening of the pressure equalizing tube is closed to prevent loss of liquid and the closure means is also controlled by a trigger. The orientation, size and shape of the triggers enables both to be depressed simultaneously. This orientation also enables the stopper to be used by a right-handed or left-handed person with equal facility.

The stopper of the instant invention provides ease of use and rapid response without obstructing the user's view of the exiting liquid. The design of the exit port and closure means provides good seals which will prevent any leakage when the bottle is inverted, tipped over or falls. Only when the triggers are depressed will liquid flow through the exit port and out of the pour spout.

It is an object of the present invention to provide a removable stopper for liquid containing bottles that will easily dispense liquids when the user activates appropriately oriented triggers, but will not permit liquid to exit through the stopper if the triggers are not depressed, regardless of the orientation of the bottle.

It is another object of the present invention to have quick action triggers that are positioned with respect to the pouring spout such that liquid is dispened easily and in direct view of the user and so that the exact quantities desired can be dispensed.

It is a further object of the present invention that the stopper have gripping ridges about the exterior of the chamber to assist in the insertion and removal of the stopper from the bottle.

Another object of the present invention is to have a compression jacket with bands of decreasing thickness about the neck of the stopper so that it can be tightly fitted into bottles with varying interior neck diameters.

A still further object of the present invention is to have a closure means within the chamber of the stopper that remains tightly sealed against the exit port until the trigger is depressed, and thereafter opens quickly and wide to permit free flow of the contained liquid through the exit port.

It is another object of the present invention that the closure means be designed such that when pressure is exerted against said closure means it cannot be forced through the exit port.

Other features and advantages of the invention will be seen from the following description and drawings.

BRIEF DESCRIPTION OF THE DRAWINGS

FIG. 1 is a perspective view of the stopper of the instant invention in use.

FIG. 2 is perspective view from the front of the stopper

FIG. 3 is a top perspective view of the stopper.

FIG. 4 is a back elevational view of the stopper.

DETAILED DESCRIPTION OF THE INVENTION

The method of use of the removable stopper 10 of the instant invention can be seen in FIG. 1. The stopper is designed to fit into the neck of a liquor bottle 11 or other such liquid containing bottle. The bottle and stopper can be gripped as a unit in one hand and the liquid can be dispensed in full view of the user in amounts determined and controlled by the user.

Figure 5:
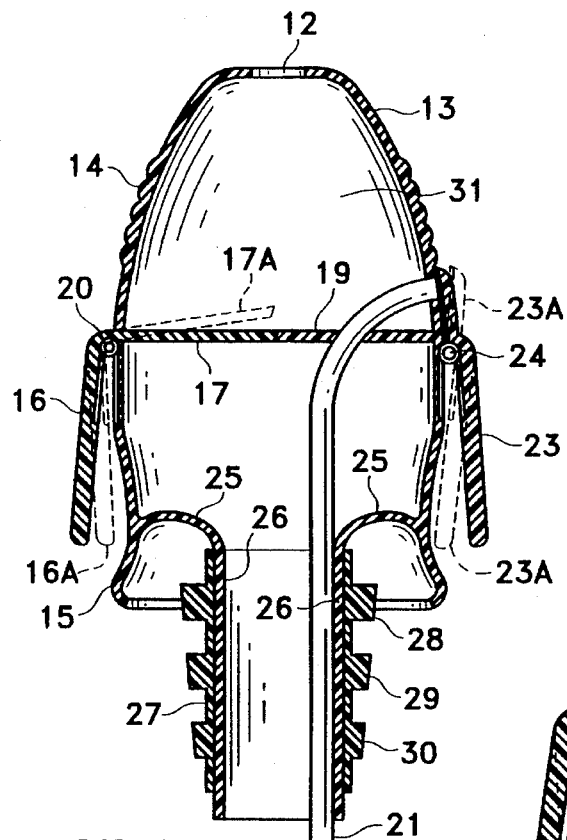
FIG. 5 is an elevational section through both triggers showing the opening of the exit port and pressure equalizing aperture when the triggers are depressed.
Figure 6:
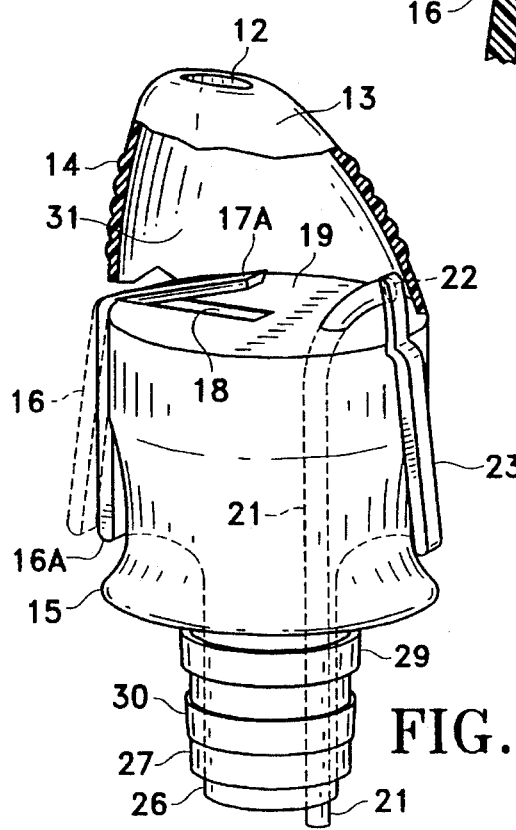
FIG. 6 is a perspective view of the stopper with a partial cut-a-way showing the open exit port and the pressure equalizing tube.

The main body of the stopper 10 has rigid walls 13, preferably rounded and eccentrically tapering upward so that the front wall portion 32 is substantially perpendicular and the back wall portion 33 slopes inward as seen in FIGS. 2, 3 and 6. The top is flat with an opening near the front of the stopper forming the pour spout 12 through which the liquid can exit. (FIG. 3) The walls and top define a chamber 31 with no bottom wall. (FIG. 5) To facilitate gripping the stopper during placement and removal there are a series of ridges 14 about the exterior circumference of the walls. The walls are made of an injection molded strong and rigid plastic or other polymeric material.

A horizontal partition 19 divides the chamber 31 into two approximately equal sections. (FIGS. 5 and 6) A slot, extending from the periphery to the center, is cut into the partition. The edges of the slot are sloped downward and inward. This slot forms port 18 through which the liquid passes. A plug 17 having edges that exactly complement the edges of the slot fits into the exit port 18. The wedge design of the edges (FIGS. 8 and 9) prevents the plug 17 from falling through the exit port 18 and prevents leakage of liquid when the bottle is tipped over or inverted.

Figure 8:
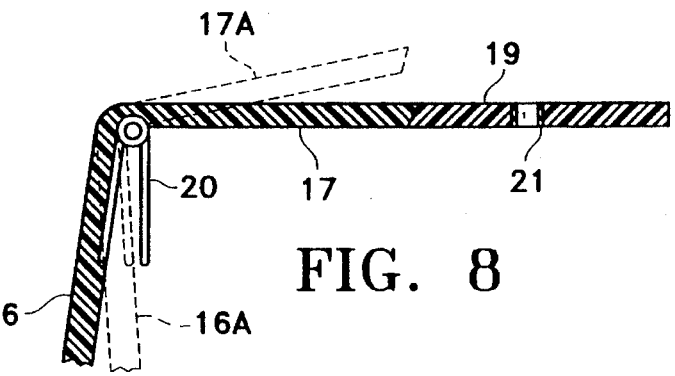
FIG. 8 is a partial sectional view of the partition through line 8—8 of FIG. 7.
Figure 9:
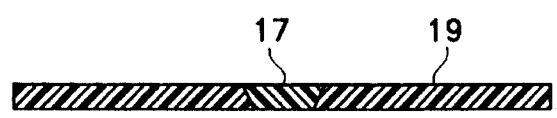
FIG. 9 is a sectional view of the partition through line 9—9 of FIG. 7.

A first trigger 16 is situated on the outside of the chamber and pivotally communicates with the plug 17 through the wall 13. The first trigger 16 is acuated by a spring 20 (FIG. 8) which is located outside the chamber and rests against the exterior surface of the wall. There can be a groove cut into the wall to hold the spring (not illustrated). When the first trigger 16 is depressed against the wall 13 the plug 17 is raised and the exit port 18 is opened. FIGS. 5, 6 and 8 show the first trigger 16 in normal orientation and when depressed 16A and the plug 17 in normal orientation and when raised 17A.

A delivery tube composed of a thinner, but strong polymeric material extends from the chamber 31 below the partition 19 into the neck of the bottle 11. The upper portion 25 of the delivery tube tapers from its attachment about the interior of the wall 13 to a constant bore portion 26. The constant bore portion 26 is sized to fit loosely into the neck of the bottle and extend downward into the neck.

Figure 10:
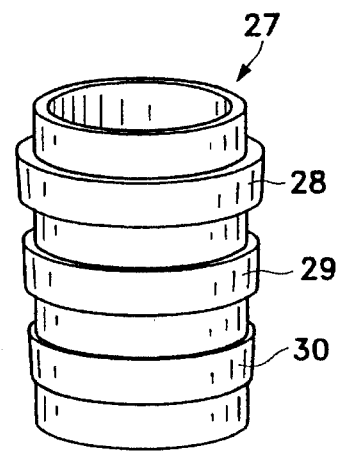
FIG. 10 is perspective view of the compressible jacket showing the stepped bands.

A collar 27 is placed about the constant bore portion 26 of the delivery tube to insure that the stopper 10 fits tightly within the neck of the bottle 11. The collar 27 is made of rubber or other compressible polymeric material and is equipped with several stepped bands 28, 29, 30 of varying thickness about its exterior circumference (FIG. 10). The uppermost band 28 being the thickest. These bands permit a tight seal of the stopper 10 within bottles with necks of varying interior diameters.

The main body walls 13 can terminate just below the attachment of the upper portion 25 of the delivery tube, or they can extend below the point of attachment, this portion of the walls forming an apron 15 as seen in FIGS. 2, 4, 5, and 6. The apron 15 can fall straight downward or curve slightly inward then flare outward as seen in the sited figures. The apron 15 conceals the point of insertion of the stopper 10 into the bottle 11 and provides a streamlined appearance to the unit (FIG. 1). The inwardly curved portion also provides an area into which the first trigger 16 can be depressed so that the proper leverage is provided and the first trigger 16 doesn't have to extend too far outward from the wall 13 of the stopper 10.

To insure the smooth flow of liquid from the bottle and through the stopper, a narrow pressure equalizing tube 21 extends from below the end of the delivery tube upward through the partition 19 and attaches to the interior of the wall 13 at a point directly opposite the plug 17. An opening 22 in the wall 13 at the point of attachment provides the means by which the air enters the pressure equalizing tube 21 and therethrough enters the bottle. To prevent any liquid from escaping through the pressure equalizing tube a second trigger 23 is attached to the exterior of the wall 13 just below the opening 22. This second trigger 23 is also actuated by a spring 24 which rests against the wall or may fit into a groove in the wall's exterior (not illustrated). When the second trigger 23 is depressed, its upper portion is drawn away from the opening 22 permiting the entrance of air. FIG. 5 shows the position of the second trigger 23A when depressed. Optionally, and not illustrated, a rubber pad or plug can be attached to the upper portion of the second trigger adjacent the opening for a better seal.

Figure 7:
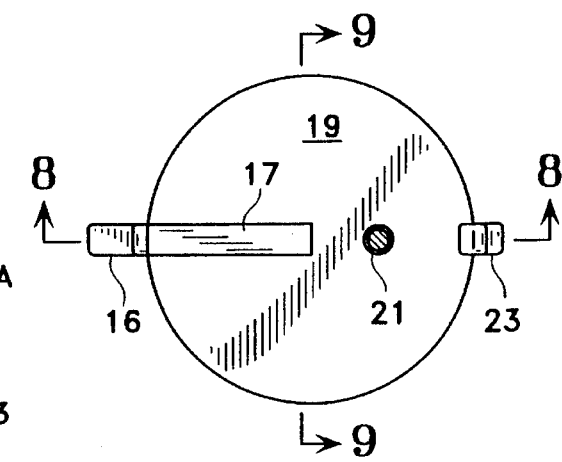
FIG. 7 is top plan view of the the partition.

Since the two triggers 16 and 23 are located 180° apart (FIG. 7), the hand can grip and depress both at the same time so that the exit port 18 and pressure equalizing opening 22 are simultaneously opened and closed at the will of the user. And, this function can be accomplished with either the right hand or the left hand. This orientation of the triggers, on each side of the stopper, with respect to the location of the pour spout 12, (at the front of stopper) also permits the best angle of flow of the liquid and a good view by the user of the liquid as it is being dispensed.

This stopper 10 was specifically designed to enable the user to dispense the desired quantity of liquid at his or her discretion. To this end, the action of both triggers must be quick for a precise opening and good flow and just as quick for a good closure with no dripping or leakage. The orientation of the triggers so that they can both be activated with the same motion, fast-acting springs, and the wedge-shaped plug insure these functions.

While one embodiment of the present invention has been illustrated and described in detail, it is to be understood that this invention is not limited thereto and may be otherwise practiced within the scope of the following claims.

I claim:

1. A removable liquid dispensing stopper adapted to be inserted into the neck of an open bottle designed for the containment of liquids, said stopper comprising:

a hollow body member having side walls, a top, an interior and an exterior; liquid dispensing means for the exit of liquid from the hollow body member, said liquid dispensing means being situated in the top of said hollow body member and communicating with the interior thereof;

a horizontally oriented partition situated within the hollow body member and dividing the interior into two sections;

a slot located in said partition extending from the perimeter to the center thereof;

closing means dimensioned to fit said slot, for preventing liquid from passing through said slot when said closing means is properly positioned;

a manually operated means situated on the exterior of the hollow body member and communicating with said closing means to activate said closing means;

delivery tube means fixedly attached about the interior circumference of the hollow body member below the partition and tapering downward to a constant bore portion sized to fit loosely within the neck of the bottle, said delivery tube means extending from the hollow body member into the neck of the bottle for providing the access through which the liquid flows from the bottle into the hollow body member;

compressible sealing means, fixedly attached to the exterior surface of the constant bore portion of said delivery tube means for providing a tight seal of the delivery tube means within the neck of the bottle; and pressure equalizing means to permit air to enter said bottle to facilitate the flow of liquid therefrom.

2. A removable liquid dispensing stopper adapted to be inserted into the neck of an open bottle designed for the containment of liquids, said stopper comprising:

a hollow body member having side walls, a top, an interior and an exterior; liquid dispensing means for the exit of liquid from the hollow body member, said liquid dispensing means being situated in the top of said hollow body member and communicating with the interior thereof;

a horizontally oriented partition situated within the hollow body member and dividing the interior into two sections;

a slot located in said partition extending from the perimeter to the center thereof, the edges of said slot being angled downward and inward;

closing means dimensioned to fit said slot and having edges angled to complement the edges of said slot such that said closing means fits said slot exactly and cannot fall through said slot, said closing means for preventing liquid from passing through said slot when said closing means is properly positioned;

a first manually operated means situated on the exterior of the hollow body member and communicating with said closing means to activate said closing means;

delivery tube means fixedly attached about the interior circumference of the hollow body member below the partition and tapering downward to a constant bore portion sized to fit loosely within the neck of the bottle, said delivery tube means extending from the hollow body member into the neck of the bottle for providing the access through which the liquid flows from the bottle into the hollow body member;

compressible sealing means, fixedly attached to the exterior surface of the constant bore portion of said delivery tube means for providing a tight seal of the delivery tube means within the neck of the bottle;

pressure equalizing means to permit air to enter said bottle to facilitate the flow of liquid therefrom;

an aperture in the wall of said hollow body member, remote from said closing means, communicating with said pressure equalizing means, said aperture for the introduction of air into said pressure equalizing means; and a second manually operable means, situated on the exterior of said hollow body member remote from said first manually operable means, to open and close said aperture.

3. A removable liquid dispensing stopper as in claim 2 further comprising:

ridge means located on the exterior of said hollow body member to prevent slippage when the stopper is being inserted or removed from the bottle.

4. A removable liquid dispensing stopper as in claim 2 wherein the compressible sealing means further comprises:

a collar of compressible material surrounding the constant bore portion of the delivery tube means, said collar having at least two stepped bands of compressible material, each band being thinner than the one above it such that the stopper can fit tightly in bottles with different neck diameters.

5. A removable liquid dispensing stopper as in claim 2 wherein the sidewalls extend downwardly beyond the delivery tube means and obscure the top of the bottle providing a streamlined appearance to the combination of bottle and stopper.

6. A removable liquid dispensing stopper as in claim 5 wherein there is a depression about the circumference of the extended portion of the sidewalls to provide additional leverage space for the manually operable means.

7. The method of controlling the flow of liquid from a bottle designed for the containment of liquids comprising the steps of:

(a) removing the bottle closure;

(b) inserting and positioning within the neck of the bottle a removable liquid dispensing stopper comprising:

a hollow body member having side walls, a top, an interior and an exterior;

liquid dispensing means for the exit of liquid from the hollow body member, said liquid dispensing means being situated in the top of said hollow body member and communicating with the interior thereof;

a horizontally oriented partition situated within the hollow body member and dividing the interior into two sections;

a slot located in said partition extending from the perimeter to the center thereof, the edges of said slot being angled downward and inward;

closing means dimensioned to fit said slot and having edges angled to complement the edges of said slot such that said closing means fits said slot exactly and cannot fall through said slot, said closing means for preventing liquid from passing through said slot when said closing means is properly positioned;

a first manually operated means situated on the exterior of the hollow body member and communicating with said closing means to activate said closing means;

delivery tube means fixedly attached about the interior circumference of the hollow body member below the partition and tapering downward to a constant bore portion sized to fit loosely within the neck of the bottle, said delivery tube means extending from the hollow body member into the neck of the bottle for providing the access through which the liquid flows from the bottle into the hollow body member;

compressible sealing means, fixedly attached to the exterior surface of the constant bore portion of said delivery tube means for providing a tight seal of the delivery tube means within the neck of the bottle;

pressure equalizing means to permit air to enter said bottle to facilitate the flow of liquid therefrom:

an aperture in the wall of said hollow body member, remote from said closing means, communicating with said pressure equalizing means, said aperture for the introduction of air into said pressure equalizing means; and a second manually operable means, situated on the exterior of said hollow body member remote from said first manually operable means, to open and close said aperture;

(c) simultaneously depressing both manually operable means;

(d) inverting the bottle over the container into which the liquid is to be dispensed;

(e) observing the flow of liquid until the desired quantity has been dispensed;

(f) simultaneously releasing both manually operable means; and (g) returning the bottle to an upward orientation.

\* \* \* \* \*